(12) United States Patent
Labbi

(10) Patent No.: US 7,318,038 B2
(45) Date of Patent: Jan. 8, 2008

(54) PROJECT RISK ASSESSMENT

(75) Inventor: Abderrahim Labbi, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1234 days.

(21) Appl. No.: 10/194,698

(22) Filed: Jul. 11, 2002

(65) Prior Publication Data

US 2003/0023470 A1 Jan. 30, 2003

(30) Foreign Application Priority Data

Jul. 30, 2001 (EP) .................................. 01118240

(51) Int. Cl.
*G06Q 10/00* (2006.01)
(52) U.S. Cl. ......................................................... 705/7
(58) Field of Classification Search ................. 705/7–9
See application file for complete search history.

(56) References Cited

U.S. PATENT DOCUMENTS

2003/0033191 A1* 2/2003 Davies et al. .................. 705/10

FOREIGN PATENT DOCUMENTS

EP 798635 A1 * 10/1997

OTHER PUBLICATIONS

Donath, Bob; "ISBM Nuggets: New Product Development Consortium—Portfolio Management", Mar. 19, 2001, ISBM New Product Development Consortium, Philadelphia, Pa, pp. 1-54. retrieved from the internet at: zope-295-a.smeal.psu.edu/isbm/documents/npd0301ko.pdf.*

Walwyn, David R; Taylor, David; Brickhill, Glenn; "Application of the Jarrow and Turnbull Model to Risk Management and the Valuation of Intellectual Property Arising from Research and Development", SAIChE 2000 Meeting, pp. 1-14, retrieved from 111.cam.witz.ac.za/mfinance/papers,wtb_riskpaper.doc.*

Ratbe, Dina; King, William R.; Kim, Young-Gul; "The fit between project characteristics and application development methodologies: a contingency approach", Winter 1999-2000, Journal of Computer Information Systems, pp. 26.*

Cooper, Robert G; Kleinschmidt, Elko J; "New product performance: what distinguishes the star products", Jun. 2000, Australian Journal of Management, 25, 2, ABI/INFORM Global, p. 17.*

(Continued)

*Primary Examiner*—Tariq R. Hafiz
*Assistant Examiner*—Jonathan G. Sterrett
(74) *Attorney, Agent, or Firm*—Scully, Scott, Murphy & Presser, P.C.; Lisa M. Yamonaco, Esq.

(57) ABSTRACT

This invention provides techniques, systems and apparatus for assessing risk associated with a project or a portfolio of projects. An example embodiment having a processor and a memory, includes storing operational values which corresponds to a different project. Each operational value is representative of a project operational parameter. A risk vector is generated for each project based on the set of operational parameters. The risk vectors are partitioned into groups of similar risk vectors having a set of membership rules. Probabilities that a new project belongs to respective groups are generated. A risk value indicative of the risk associated with the new project is generated based on the probabilities generated. In some embodiments, the technique also assesses portfolio risk and utilizes an optimization algorithm to estimate acceptable or desirable margins to charge for each project in a portfolio of projects.

17 Claims, 3 Drawing Sheets

OTHER PUBLICATIONS

Jarrett, E.L.; "The Role of Risk in Business Decision-Making, or How to Stop Worrying and Love the Bombs", Research Technology Management, Nov./Dec. 2000; 43, 6; ABI/INFORM Global, p. 44.*

Lavallee, Ryan, "IDe's IDweb™ Software supports PMI® PMBOK® Standards", copyright 2000 Integrated Development Enterprise, pp. 1-6, http://www.ide.com/pdfs/PMBOK.pdf.*

McGrath, Michael; Iansiti, Marco, "Envisioning IT-Enabled Innovation", Dec. 1998, PRTM Insight Magazine, pp. 1-11, www.prtm.com/insight/article.asp?insight_id=2737.*

"Research note: theoretical optimisation of IT/IS investments" Sharif, Amir M: Irani, Zahir, 1999 Logistics Information Management v12n1/2 pp. 189-196.*

"Controlling prototype development through risk analysis" Baskerville, Richard L; Dec. 1996, Stage, Jan MIS Quarterly v20n4 pp. 481-504.*

"Refining the use of Monte Carlo techniques for risk analysis in project planning", Dec. 1999, Balcombe, KG; Smith LED; Journal of Development Studies, 36, 2, 113. Dialog 12131712.*

\* cited by examiner

PROJECT RISK ASSESSMENT

FIELD OF THE INVENTION

The present invention generally relates to project risk assessment and particularly relates to methods and data processing systems for assessing risk associated with projects and portfolios of projects.

DESCRIPTION OF RELATED ART

Business environments are changing with increasing frequency. Most commercial entities are finding an increasing need to adapt decision making processes to deal with a range of agents of change. Such changes can be both internal and external in nature. Examples of internal changes include changes in skill set, and changes in turnover. Examples of external changes include changes in customer set, changes in customer demand, changes in technology, and changes in marketplace. Accordingly, it is becoming increasingly difficult for commercial entities to assess and cost risks associated with customer contract portfolios in such a manner that the contracts remain both profitable and competitively priced. Relatively small losses on individual contracts can combine to produce significant profit erosion across a large number of coexisting projects. Accordingly, it would be desirable to provide a data processing method and system for assessing risks associated with projects and portfolios of projects.

SUMMARY OF THE INVENTION

An aspect of the present invention provides methods, apparatus and systems for assessing risk associated with a project in a data processing system including a processor and a memory. The method comprising: storing sets of operational values in the memory, each set corresponding to a different project and each operational value being representative of an operational parameter of the corresponding project; and, in the processor, generating a risk vector for each project based on the set of operational parameters for that project, partitioning the risk vectors into groups of similar risk vectors, determining a set of membership rules for each group based on the risk vectors therein, generating probabilities that a new project belongs to respective groups based on the membership rules associated with the each group, and, based on the probabilities generated for the new project, generating a risk value indicative of the risk associated with the new project.

An aspect of the partitioning of the risk vectors includes the processor executing a hierarchical clustering technique. Such a hierarchical clustering technique may have the Kohonen algorithm. The determining of the set of membership rules advantageously has the processor executing a predictive modeling algorithm. Such a predictive modeling algorithm may have boosted decision trees. Advantageous embodiments of the present invention further have recording a set of operational values corresponding to the new project in the memory, each operational value being representative of an operational parameter of the new project.

A further aspect of the present invention extends to a computer program element comprising computer program code means which, when loaded in a processor of data processing system comprising a memory, configures the processor to perform such a risk assessment method.

A further aspect of the present invention also extends to a method for assessing, in a data processing system comprising a processor and a memory, risk associated with a portfolio of projects, performing a method for assessing risk as hereinbefore described for each project in the portfolio, and, based on the risk values thus generated for each project, generating a risk value indicative of the risk associated with the portfolio.

In a still further aspect of the present invention, the present invention provides a data processing system for assessing risk associated with a project. In an example embodiment, the system includes: a memory storing sets of operational values in the memory, each set corresponding to a different project and each operational value being representative of an operational parameter of the corresponding project; and a processor for generating a risk vector for each project based on the set of operational parameters for that project, partitioning the risk vectors into groups of similar risk vectors, determining a set of membership rules for each group based on the risk vectors therein, generating probabilities that a new project belongs to respective groups based on the membership rules associated with the each group, and, based on the probabilities generated for the new project, generating a risk value indicative of the risk associated with the new project.

BRIEF DESCRIPTION OF THE DRAWINGS

Advantageous embodiments of the present invention will now be described, by way of example only, with reference to the accompanying drawings, in which.

DETAILED DESCRIPTION OF THE INVENTION

Figure 1:
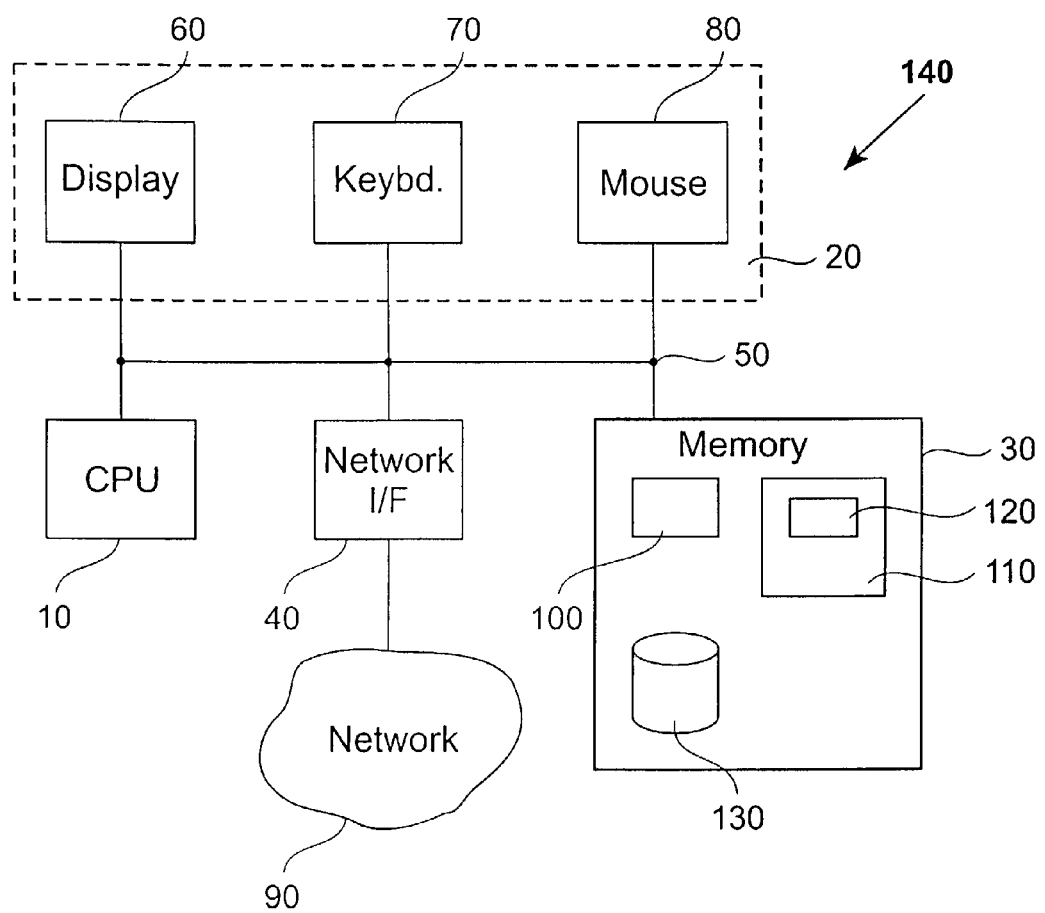
FIG. 1 is a block diagram of a project risk assessment system embodying the present invention.

The present invention provides methods, apparatus and systems for assessing, in a data processing system having a processor and a memory, risk associated with a project. In an example embodiment, the method includes: storing sets of operational values in the memory, each set corresponding to a different project and each operational value being representative of an operational parameter of the corresponding project; and, in the processor, generating a risk vector for each project based on the set of operational parameters for that project, partitioning the risk vectors into groups of similar risk vectors, determining a set of membership rules for each group based on the risk vectors therein, generating probabilities that a new project belongs to respective groups based on the membership rules associated with the each group, and, based on the probabilities generated for the new project, generating a risk value indicative of the risk associated with the new project.

The partitioning of the risk vectors advantageously has the processor executing a hierarchical clustering technique. Such a hierarchical clustering technique may include the Kohonen algorithm. The determining of the set of membership rules advantageously includes the processor executing a predictive modeling algorithm. Such a predictive modeling algorithm may include boosted decision trees. Advantageous embodiments of the present invention further include recording a set of operational values corresponding to the new project in the memory, each operational value being representative of an operational parameter of the new project.

The present invention extends to a computer program element having computer program code means which, when loaded in a processor of data processing system including a memory, configures the processor to perform such a risk assessment method. The present invention also extends to a method for assessing, in a data processing system including a processor and a memory, risk associated with a portfolio of projects, performing a method for assessing risk as hereinbefore described for each project in the portfolio, and, based on the risk values thus generated for each project, generating a risk value indicative of the risk associated with the portfolio.

Viewing the present invention from another aspect, there is now provided a data processing system for assessing risk associated with a project. In a particular embodiment the system includes: a memory storing sets of operational values in the memory, each set corresponding to a different project and each operational value being representative of an operational parameter of the corresponding project; and a processor for generating a risk vector for each project based on the set of operational parameters for that project, partitioning the risk vectors into groups of similar risk vectors, determining a set of membership rules for each group based on the risk vectors therein, generating probabilities that a new project belongs to respective groups based on the membership rules associated with the each group, and, based on the probabilities generated for the new project, generating a risk value indicative of the risk associated with the new project.

In an advantageous embodiment of the present invention to be described shortly, there is provided an adaptive system for reducing profit loss by learning quantitative project performance measures based on mining a database storing historical project data. The historical project data describes aspects of a project such as finances, management, schedule, and quality. The system uses the measures to segment a project portfolio into plural groups or sub-portfolios of homogeneous risk. The system uses risk information to establish project pricing margins such that the overall portfolio is likely to be profitable. Initially, the system analyses the project data to extract a set of risk factors reflecting variability of and impact on profitability of the project. This is defined as a gross profit loss function ΔGP. The risk factors can be regarded as coordinates in a risk space in which each project is represented by a risk vector. Next, the system employs a clustering algorithm to segment the project data into plural project groups or classes of homogeneous risk. The clustering algorithm identifies groups of projects having similar risk vectors and therefore similar risk factors. The system then employs a classification process based on boosted decision trees. The classification process produces a mapping between the project risk space and the segmented risk groups. The classification process serves as a probabilistic estimator to estimate which of the risk groups is probably most suitable for receiving a new project. The system then uses the estimated risk group probabilities to predict the gross profit loss or gain of the new project. The predicted loss or gain is then employed to determine the appropriate gross profit margin for the new project to guarantee a desired level of profitability. For a given set of projects, the system employs a portfolio loss function, Loss=ΣΔGP, and utilizes a stochastic optimization process such as Monte Carlo Markov Chain function, to produce project portfolios yielding optimum profitability based on the probability distributions of the associated risk factors.

Referring first to FIG. 1, an example of a risk assessment system embodying the present invention has a data processing system 140. The data processing system 140 has a central processing unit (CPU) 10, an input output (I/O) subsystem 20, a memory subsystem 30, and a network interface adapter 40, all interconnected by a bus subsystem. The I/O subsystem includes a display device 60, a keyboard 70, and a pointing device 80 each connected to the bus subsystem 50. The network adapter 40 is connected to a data communications network 90. In the memory subsystem is stored computer program code including operating system software 100 and application software 110. Also stored in the memory subsystem 30 is a database 130. The application software includes project risk assessment application software 120 to be described in detail shortly. The memory subsystem 30 includes a combination of read only memory, random access memory, and mass data storage such as hard disk files and the like. The pointing device 80 may be in the form of a mouse, track ball, touch pad, pointing stick, or the like. The display device 60 may be provided by a cathode ray tube display, liquid crystal display panel, or similar visual display device. For example, the central processing unit may be in the form of a microprocessor such as an Intel Pentium 4 microprocessor available from Intel Corporation. The data communications network 90 may be a local area network (LAN) such as an ethernet LAN or a wide area network such as the Internet. Accordingly, depending on the form of the data communications network 90, the network adapter 40 may be a local area network adapter such as an ethernet adapter or a wide area network adapter such and an integrated services digital network (ISDN) network adapter.

In operation, the central processing unit 10 is configured by the operating system software to execute the application software 110 such as the risk assessment software 120. The bus subsystem 50 facilitates local communication of data and program code between the I/O subsystem 20, the memory subsystem 30, the CPU 10, and the network adapter 40. A user can select an item of application software to be executed by the CPU 10 via either the keyboard 70 or the mouse 80. The keyboard 70 and the mouse thereafter allow the user to control the execution of the selected application software by the CPU 10 by entry of data and/or control commands. The display 20 provides a visual feedback interface between the user and the application software and underlying operating software. The network adapter 40 enables communication of data between the data processing system 140 and other information handling systems connected to the network 90 such as printers, data storage devices, and other data processing systems.

Figure 2:
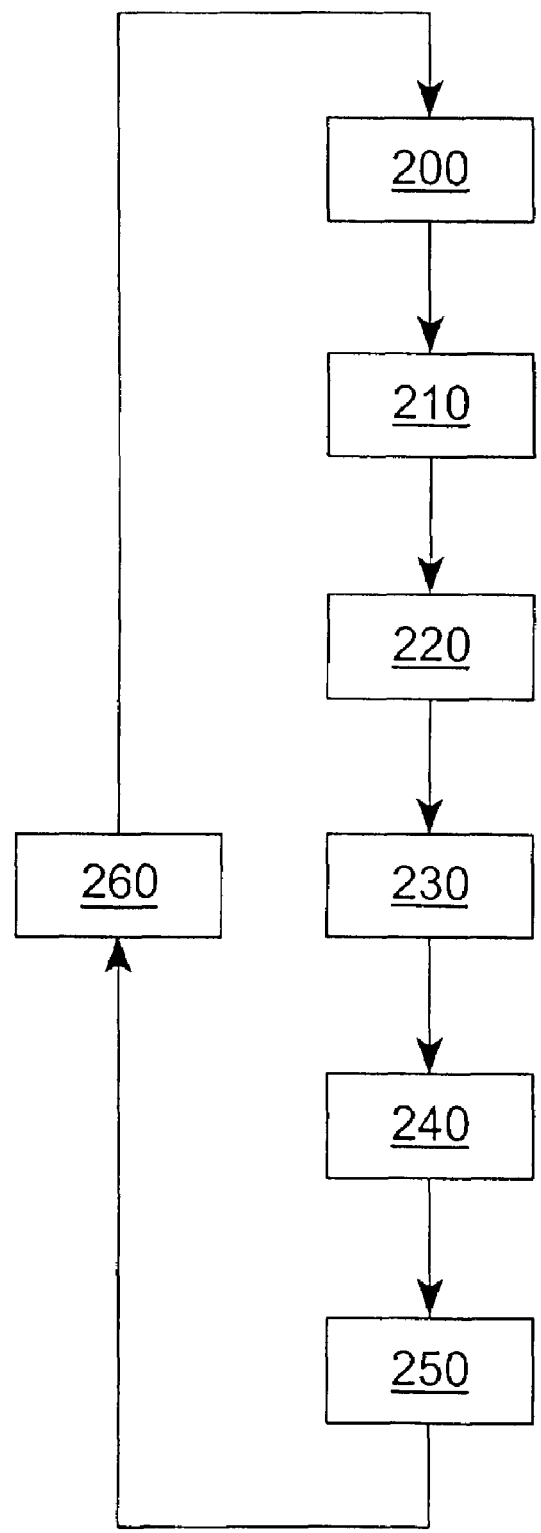
FIG. 2 is a flow chart corresponding to a project risk assessment system embodying the present invention in operation.

Referring now to FIG. 2, an advantageous example of a project risk assessment process for embodiment in the risk assessment software 120 executable by the CPU 10 will now be described in detail. The process includes project risk identification, assessment, and pricing. At step 200 of the process, historical project data describing completed projects is stored in the database 130. The project data describes each completed projects in terms of a plurality of operational parameters such as Duration, Fixed Price or Time & Material, Industry Type, Customer Type, Geography, Quality Assurance Rating, etc. and financial parameters such as Planned Revenue, Planned Cost, Planned Profit Margin, Planned Contingency, Actual Revenue, Actual Cost, Actual Profit Margin, Actual Duration, Actual QA Rating at Delivery, etc.

For each project, the following notations are defined:
AP_Rev: approved or planned revenue;
AP_Cost: approved or planned cost;
AP_GP=AP_Rev−AP_Cost: approved or planned gross profit;

$$AP\_GP\ \% = \frac{AP\_GP}{AP\_Rev};$$

approved or planned gross profit margin;
AP_T: approved or planned project duration;
AC_Rev: actual revenue;
AC_Cost: actual cost;
AC_GP=AC_Rev−AC_Cost: actual gross profit;
AC_T: actual project duration;

$$AC\_GP\ \% = \frac{AC\_GP}{AC\_Rev};$$

actual gross profit margin;

$$a = \frac{AC\_Rev}{AP\_Rev};$$

fraction of approved revenue which was actually generated by project;

$$b = \frac{AC\_Cost}{AP\_Cost};$$

fraction of approved cost which was actually incurred by project;

$$\delta = \frac{b}{a};$$

this is a second order measure of how revenue was generated out of the incurred costs. δ measures a matching ratio between the actual and the approved profit margins; and, $$\tau = \frac{AC\_T}{AP\_T};$$

this is a ratio which measures a matching between the planned and actual project durations. The project is on schedule when τ=1, otherwise it can be ahead of schedule (τ<1), or behind schedule (τ>1).

Based on the notations set out above, the actual gross profit margin can be defined as:

$$AC\_GP\% = 1 - \delta + \delta.AP\_GP\% \quad (1)$$

It will be appreciated from equation (1) that if revenue and cost were generated by a project as planned (according to the planned profit margin), then δ=1, and AC_GP%=AP_GP%. Otherwise, if the actual revenue of a project was generated at lower profit margin, with more cost actually incurred than planned, then δ>1. In the opposite scenario, where the actual revenue was generated with less actual cost, then δ<1.

Given the planned and actual financial performance of a project, the actual loss or gain in project profitability can be measured. This measure is referred to ΔGP or "profit erosion". ΔGP can be defined by:

$$\Delta GP = (AC\_GP\% - AP\_GP\%).AC\_Rev = a.(1-\delta).AP\_Cost \quad (2)$$

wherein ΔGP varies as a function of three variables: a, δ, and AP_Cost. These variables, together with τ (the measure for schedule) collectively define the associated project in terms of a risk vector (a, δ, τ, AP_Cost).

Similarly, the loss or gain in profit margin can be defined as:

$$\Delta GP\ \% = (AC\_GP\ \% - AP\_GP\ \%) \quad (3)$$
$$= (1 - \delta) \cdot (1 - AP\_GP\ \%)$$

Therefore, the actual loss or gain in a project profitability can be summarized via the following two expressions:

$$\Delta GP = a.(1-\delta).AP\_Cost$$

$$\Delta GP\% = (1-\delta).(1-AP\_GP\%) \quad (4)$$

At step 210 of the process, the CPU 210 computes the risk vector parameters and losses or gains for each project in the project portfolio based on the project data recorded in the database 130. At step 220 of the process, the projects in the portfolio recorded in the database 130 are segmented, by the CPU 10 into subgroups of projects with similar risk vectors. In a particularly advantageous embodiment of the present invention, a hierarchical clustering technique, based on the Kohonen algorithm, is employed by the CPU 10 to identify such homogeneous risk groups (G1, G2, . . . , Gk) of projects defined by similar risk vectors and bearing similar losses or gains, ΔGP and ΔGP%. The risk vectors have probability distributions which may be estimated by the CPU 10 from the historical data stored in the database 130.

Figures 3, 4:
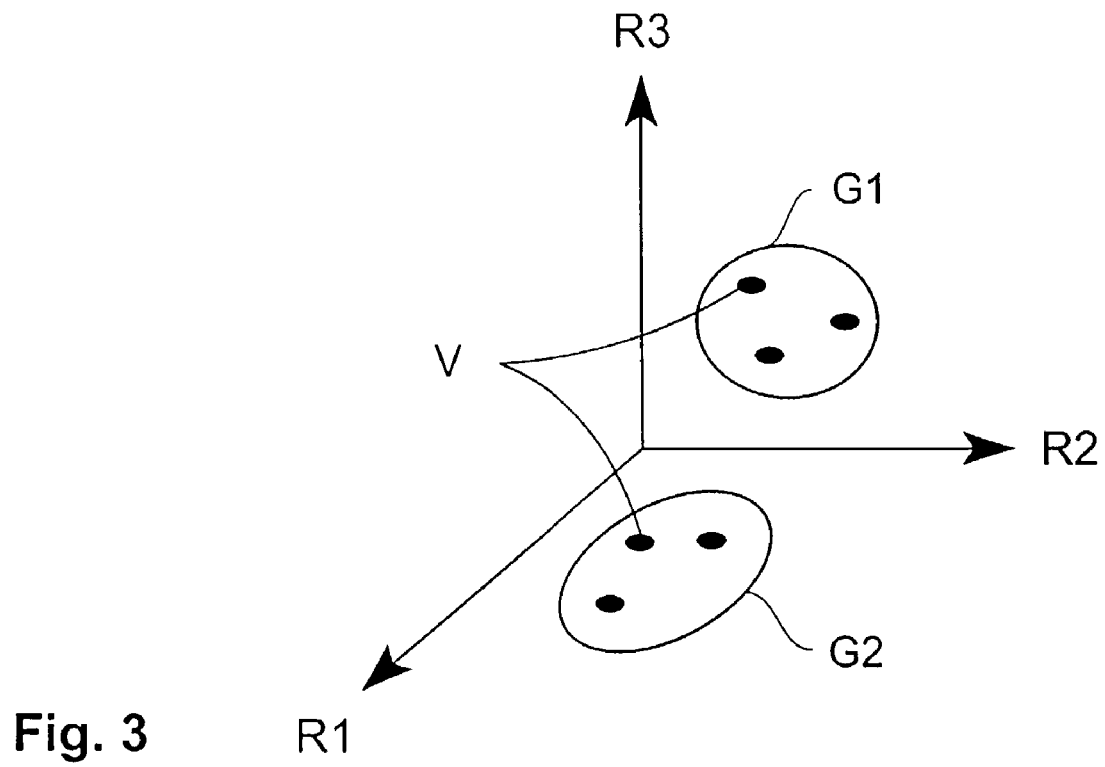
FIG. 3 is a graphical illustration of a risk space based on 3 three risk factors.
FIG. 4 is a flow chart corresponding to another project risk assessment system embodying the present invention in operation.

For example, FIG. 3 shows a simplified graphical illustration of a risk space defined by 3 risk factors R1, R2, and R3. It will be appreciated however that, in practice there may be many more than three risk factors of interest and therefore that the risk space may be defined in many more dimensions. As herein before described with reference to FIG. 2, at step 210, the locations in the risk space of a plurality of risk vectors v each representing a different project are located in the space at points are determined based on the corresponding risk factors. The vectors are then grouped together homogenous risk groups G1 and G2 at step 220.

Returning to FIG. 2, once the different risk groups are defined, then, at step 230 of the process, the CPU 10 characterizes membership of each project to any of the risk groups. The characterization is achieved by the CPU 10 determining probabilistic decision rules which assign group membership probabilities to each project. In particularly advantageous embodiments of the present invention, the determination of the rules is accomplished by the CPU 10 executing a predictive modeling algorithm based on boosted decision trees. Such an algorithm is desirable because it avoids the problem of overfitting which may otherwise occur when learning in multidimensional spaces with small size data samples.

For example, the modeling algorithm may determine that projects within Group 2 were generally performed in the South and yielded a total revenue of over $5 million at a gross profit margin of less than 10%. Thus, given data describing previously completed projects recorded in the database 130, and the set of defined risk groups (G1, G2, . . . , Gk), risk group membership probabilities (p1, p2, . . . , pk) can be estimated by the CPU 10 for any given project.

In step 240 of the process, the expected loss or gain of a new project P is estimated by the CPU 10 based on the characteristics of the new project P and the probabilities (p1, p2, . . . , pk) of membership of the new project P to the defined risk groups (G1, G2, . . . , Gk). The expected loss or gain of the new project P is determined by the CPU 10 based on:

$$E[\text{Loss}(P)] = \text{Loss}(P|P\epsilon G1).p1 + \text{Loss}(P|P\epsilon G2).p2 + \ldots + \text{Loss}(P|P\epsilon Gk).pk \quad (5)$$

where Loss(P|P∈Gk) is the expected loss on the new project P, given that the new project P belongs to group Gk. This is defined as:

$$\text{Loss}(P|P\epsilon Gk) = \int_{Gk} DGP.g_a(a).g_d(\delta) da.d\delta$$

wherein $g_a(a)$ and $g_d(\delta)$ are probability density functions of factors a and δ estimated by the CPU 10 from the data stored in the database 130. At step 250 of the process, the CPU 10 employs equation (5) to evaluate different pricing scenarios by CPU 10 estimating, via equation (4), the expected actual margin and loss for a new project priced at some margin. The estimate may be used by an operator of the system for a range of purposes, such as adapting the profit margin and/or establishing a reserved contingency to cover the underlying risk. At step 260 of the process, project data associated with the performance of the new project, the associated project data is fed back into the database 130 by the CPU 10. The data from the new project thus becomes part of the stored historical data against which subsequent projects can be assessed. It will be appreciated therefore that the process hereinbefore described, and the definition of group membership rules in particular, is adjusted as the content of the database 130 grows with the addition of data corresponding to each new project.

The advantageous embodiment of the present invention hereinbefore described have been concerned with assessing and pricing the risk of a new project. However, the present invention is not limited in application to such a task. For example, in a particularly advantageous embodiment of the present invention to be described shortly, the process hereinbefore described is extended to the analysis to portfolios of projects. Such an analysis is particularly desirable in business environments where a portfolio containing only low risk projects is not viable or where projects can be priced with high flexibility (i.e. low sensitivity of the customer to project price). In such environments, portfolios of projects having different levels of risk are advantageous A service provider responsible for such a portfolio can then be more competitive in the marketplace because it can increase market share by bidding on high risk projects if it can support the underlying risk with other low risk projects.

Referring now to FIG. 4, in an advantageous embodiment of the present invention there is provided a process for determining the most competitive or otherwise acceptable margins to apply to a set of P new projects (P1, P2, . . . , Pn) to produce a desired profit for an overall portfolio of the new projects together with Q ongoing projects (Q1, Q2, . . . , Qm) based on estimated risks associated with each project in the overall portfolio. At step 300 of the process, the losses or gains of each project are computed by the CPU 10 as hereinbefore described in accordance with equation (5) based on the parameters stored in the database 130 in connection with each project. At step 310 of the process, the overall cumulative loss or gain associated with the overall project portfolio of the Q ongoing projects and the P new projects is computed by the CPU 10 based on the following formula:

$$E[Loss] = E[Loss(Q)] + E[Loss(P)]$$
$$= E[Loss(Q)] + \sum_i E[Loss(Pi)]$$
$$= E[Loss(Q)] + \sum_i \sum_j Loss(Pi \mid Pi \in Gj) \cdot p(Pi \in Gj)$$

For the Q ongoing projects, E[Loss(Q)] is fixed, while E[Loss(P)] varies with the characteristics of the new projects (P1, P2, . . . , Pn). Such variation is indicated by the estimates of Loss(Pi|Pi∈Gj) and of p(Pi∈Gj). At step 320, the CPU 10 determines pricing for the P new projects to obtain a desired distribution of profit margins over the overall portfolio and to maximize the gain or minimize the loss associated with the overall portfolio.

In a particularly advantageous embodiment of the present invention, the CPU 10 performs step 320 by solving a constrained stochastic optimization problem to minimize E[Loss] under the constraint that the expected profit margins are distributed according to the desired distribution. For example, the desired distribution may be a normal distribution with a predefined mean and variance. Conventional gradient-based methods are undesirable for solving the stochastic optimization problem because the loss function to be minimized is not differentiable for all variables of a project and because there is a stochastic constraint. Therefore, in an especially advantageous embodiment of the present invention, the CPU 10 utilizes a random sampling process such as the Monte Carlo Markov Chain process to generate the optimal solutions.

In the advantageous embodiments of the present invention hereinbefore described, each new project or set of new projects is assessed in terms of risk prior to commencement. However, it will be appreciated that the present invention is equally applicable to continuous or periodic risk assessment during the lifetime of a project or set of projects. By way of example, for projects having a series of phases, a risk assessment may be conducted in accordance with the present invention for each phase based on corresponding historical data collected and recorded in the database as hereinbefore described.

In summary, by way of example of the present invention, techniques have been described herein for assessing, in a data processing system including a processor and a memory, risk associated with a project. The method often includes: storing sets of operational values in the memory, each set corresponding to a different project and each operational value being representative of an operational parameter of the corresponding project; and, in the processor, generating a risk vector for each project based on the set of operational parameters for that project, partitioning the risk vectors into groups of similar risk vectors, determining a set of membership rules for each group based on the risk vectors therein, generating probabilities that a new project belongs to respective groups based on the membership rules associated with the each group, and, based on the probabilities generated for the new project, generating a risk value indicative of the risk associated with the new project. The technique also assesses portfolio risk and utilizes an optimization algorithm to estimate acceptable or desirable margins to charge for each project in a portfolio of projects.

While the invention has been described herein with reference to advantageous embodiments, it will be appreciated by those skilled in the art that various changes in form and detail may be made therein without departing from the scope of the invention. Thus, the present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which includes all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which includes a computer usable medium having computer readable program code means embodied therein for causing a function described above. The computer readable program code means in the article of manufacture includes computer readable program code means for causing a computer to effect the steps of a method of this invention. Similarly, the present invention may be implemented as a computer program product including a computer usable medium having computer readable program code means embodied therein for causing a function described above. The computer readable program code means in the computer program product including computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method in a data processing system having a processor and a memory, said method comprising assessing risk associated with a project by:

storing sets of operational values in the memory, each set corresponding to a different previously completed project and each operational value being representative of an operational parameter of a corresponding previously completed project;

generating, in the processor, a risk vector for each previously completed project based on the set of operational parameters for that previously completed project;

partitioning the risk vectors into groups $(G_1, G_2, \ldots, G_k)$ of similar risk vectors for previously completed projects bearing similar profitability margins;

determining a set of membership rules for each group based on the risk vectors therein;

generating risk group membership probabilities $(p_1, p_2, \ldots, p_k)$ that a new project (P) belongs to at least one respective group based on the membership rules associated with the each group;

generating a risk value indicative of the risk associated with the new project (P) based on the probabilities generated for The new project, said risk value comprising an estimation of an expected financial loss or gain of said new project (P) based on said probabilities, said expected financial loss estimation $E[\text{Loss}(P)]$, given that the new project (P) belongs to group $G_k$, is based on $$E[\text{Loss}(P)] = \text{Loss}(P|P \in G_1) \cdot p_1 + \text{Loss}(P|P \in G_2) \cdot p_2 + \ldots + \text{Loss}(P|P \in G_k) \cdot p_k$$

where $$\text{Loss}(P|P \in G_k) = \int_{G_k} DGP \cdot g_a(a) \cdot g_d(\delta) \, da \cdot dg$$

and where $g_a(a)$ and $g_d(\delta)$ are estimated probability density functions of financial operating parameters "a" and "δ", where "a" represents fraction of approved revenue actually generated by a project, δ=b/a represents a matching ratio between actual and the approved profit margins where "b" represents a fraction of approved cost which was actually incurred by a project, and DGP is a measure of actual loss or gain in project profitability which is a function of "a", "δ" and an approved cost financial value; and, providing said estimation to a user for adapting a pricing strategy for said new project based on said estimation.

2. A method as claimed in claim 1, wherein the step of partitioning the risk vectors includes the processor executing a hierarchical clustering technique.

3. A method as claimed in claim 2, wherein the hierarchical clustering technique comprises the Kohonen algorithm.

4. A method as claimed in claim 1, wherein the step of determining of the set of membership rules includes the processor executing a predictive modeling algorithm.

5. A method as claimed in claim 4, wherein the predictive modeling algorithm includes decision trees.

6. A method as claimed in claim 1, further comprising recording a set of operational values corresponding to the new project in the memory, and having each operational value being representative of an operational parameter of the new project.

7. A method as claimed in claim 1, further comprising:
performing steps for assessing risk for each project in a portfolio of projects;

generating a project risk value for each project in the portfolio, and generating a portfolio risk value indicative of the risk associated with the portfolio based on the project risk value for each of the projects in the portfolio.

8. A data processing system for assessing risk associated with a project, the system comprising:

a memory storing sets of operational values in the memory, each set corresponding to a different previously completed project and each operational value being representative of an operational parameter of the corresponding previously completed project;

a processor for generating a risk vector for each said different previously completed project based on a project set of operational parameters for that different project;

said processor partitioning the risk vectors into groups ($G_1, G_2, \ldots, G_k$) of similar risk vectors;

said processor determining a set of membership rules for each group based on the risk vectors therein;

said processor generating risk group membership probabilities ($p_1, p_2, \ldots, p_k$) that a new project (P) belongs to respective groups based on membership rules associated with each group; and said processor generating a risk value indicative of the risk associated with the new project based on the probabilities generated for the new project, said risk value comprising an estimation of an expected financial loss or gain of said new project (P) based on said probabilities, said expected financial loss estimation E[Loss(P)], given that the new project (P) belongs to group $G_k$, is based on $$E[\text{Loss}(P)] = \text{Loss}(P|P \in G_1) \cdot p_1 + \text{Loss}(P|P \in G_2) \cdot p_2 + \ldots + \text{Loss}(P|P \in G_k) \cdot p_k$$

where $$\text{Loss}(P|P \in G_k) = \int_{Gk} DGP \cdot g_a(a) \cdot g_d(\delta) \, da \cdot dg$$

and where $g_a(a)$ and $g_d(\delta)$ are estimated probability density functions of financial operating parameters "a" and "δ", where "a" represents a fraction of approved revenue actually generated by a project, δ=b/a represents a matching ratio between actual and the approved profit margins where "b" represents a fraction of approved cost which was actually incurred by a project, and DGP is a measure of actual loss or gain in project profitability which is a function of "a", "δ" and an approved cost financial value, wherein said estimation is provided to a user and implemented for adapting a pricing strategy for said new project based on said estimation.

9. An article of manufacture comprising a computer usable medium having computer readable program code means embodied therein for causing risk assessment, the computer readable program code means in said article of manufacture comprising computer readable program code means for causing a computer to effect the steps of claim 1.

10. A program storage device readable by machine, tangibly embodying a program of instructions executable by the machine to perform method steps for risk assessment, said method steps comprising the steps of claim 1.

11. An article of manufacture comprising a computer usable medium having computer readable program code means embodied therein for causing risk assessment, the computer readable program code means in said article of manufacture comprising computer readable program code means for causing a computer to effect the steps of claim 7.

12. A program storage device readable by machine, tangibly embodying a program of instructions executable by the machine to perform method steps for risk assessment, said method steps comprising the steps of claim 7.

13. A computer program element comprising computer program code means which, when loaded in a processor of data processing system comprising a memory, configures the processor to perform a method as claimed in claim 1.

14. The method as claimed in claim 1, wherein said DGP is measured as:

DGP=a·(1-δ)·AP_Cost, where AP_Cost is said approved cost value.

15. The data processing system as claimed in claim 8, wherein said DGP is measured as:

DGP=a·(1-δ)·AP_Cost, where AP_Cost is said approved cost value.

16. The method as claimed in claim 1, wherein said generating a risk value estimation is used to evaluate different pricing scenarios, said method further comprising estimating an expected actual margin and loss for said new project priced at some margin.

17. The data processing system as claimed in claim 8, wherein said generating a risk value further comprises: evaluating, by said processor, different pricing scenarios to estimate an expected actual margin and loss for a new project priced at some margin.

* * * * *